US011131362B2

(12) United States Patent
Flacht

(10) Patent No.: US 11,131,362 B2
(45) Date of Patent: Sep. 28, 2021

(54) HYDRAULIC DAMPER WITH A HYDRAULIC COMPRESSION STOP ASSEMBLY

(71) Applicant: BeijingWest Industries Co., Ltd., Beijing (CN)

(72) Inventor: Piotr Andrzej Flacht, Cracow (PL)

(73) Assignee: BEIJINGWEST INDUSTRIES CO., LTD., Beijing (CN)

( * ) Notice: Subject to any disclaimer, the term of this patent is extended or adjusted under 35 U.S.C. 154(b) by 0 days.

(21) Appl. No.: 16/854,255

(22) Filed: Apr. 21, 2020

(65) Prior Publication Data
US 2020/0248775 A1    Aug. 6, 2020

Related U.S. Application Data

(63) Continuation of application No. 15/843,546, filed on Dec. 15, 2017, now Pat. No. 10,670,107.

(51) Int. Cl.
*F16F 9/49* (2006.01)
*F16F 9/516* (2006.01)
(Continued)

(52) U.S. Cl.
CPC .............. *F16F 9/516* (2013.01); *B60G 13/08* (2013.01); *B60G 15/061* (2013.01); *B60G 17/08* (2013.01);
(Continued)

(58) Field of Classification Search
CPC ........ F16F 9/49; F16F 9/06; F16F 9/48; F16F 9/062; F16F 9/063; F16F 9/067;
(Continued)

(56) References Cited

U.S. PATENT DOCUMENTS 10,670,107 B2 *   6/2020   Flacht .................. B60G 15/061

FOREIGN PATENT DOCUMENTS

CN          1916436 A      2/2007
CN       105782326 A       7/2016
(Continued)

OTHER PUBLICATIONS

First Office Action and Search Report dated Jul. 2, 2021 for counterpart Chinese patent application No. 202010668098.3, along with EN translation.

*Primary Examiner* — Robert A. Siconolfi
*Assistant Examiner* — Stephen M Bowes
(74) *Attorney, Agent, or Firm* — William H. Honaker; Dickinson Wright PLLC

(57) ABSTRACT

A hydraulic damper for a vehicle including a main tube. A first piston assembly is slideably disposed in the main tube and axially divides the main tube into a rebound chamber and a primary compression chamber. A hydraulic compression stop assembly is disposed in the primary compression chamber and includes a narrowed section extending between an open end and a closed end. A second piston assembly is slideably disposed in the narrowed section and is coupled with the first piston assembly. The second piston assembly has a piston tube that extends between an opened end and a shut end. A displaceable partition is slideably disposed in the piston tube. A first auxiliary compression chamber is defined between the partition and the closed end of the narrowed section. A second auxiliary compression chamber is defined between the partition and the shut end of the piston tube.

14 Claims, 4 Drawing Sheets

(51) Int. Cl.
  *B60G 13/08* (2006.01)
  *B60G 15/06* (2006.01)
  *B60G 17/08* (2006.01)
  *F16F 9/16* (2006.01)
  *F16F 9/346* (2006.01)
  *F16F 13/00* (2006.01)

(52) U.S. Cl.
  CPC ............ *F16F 9/165* (2013.01); *F16F 9/3465* (2013.01); *F16F 9/49* (2013.01); *F16F 13/007* (2013.01); *B60G 2202/24* (2013.01); *B60G 2206/41* (2013.01); *B60G 2500/10* (2013.01); *B60G 2800/162* (2013.01); *F16F 2228/066* (2013.01); *F16F 2230/42* (2013.01)

(58) Field of Classification Search
  CPC .. F16F 9/486; F16F 9/512; F16F 9/483; F16F 9/585; F16F 9/58; F16F 9/342; F16F 13/007
  See application file for complete search history.

(56) References Cited

FOREIGN PATENT DOCUMENTS

| | | |
|---|---|---|
| CN | 105927691 A | 9/2016 |
| CN | 107143605 A | 9/2017 |
| JP | 2014163496 A | 9/2014 |
| WO | 2016126776 A1 | 8/2016 |
| WO | 2016146660 A1 | 9/2016 |
| WO | 2017001675 A1 | 1/2017 |

\* cited by examiner

HYDRAULIC DAMPER WITH A HYDRAULIC COMPRESSION STOP ASSEMBLY

CROSS-REFERENCE TO RELATED APPLICATIONS

This patent application is a continuation of U.S. patent application Ser. No. 15/843,546, filed Dec. 15, 2017, the entire disclosure of which is incorporated herein by reference.

TECHNICAL FIELD

The present invention generally relates to a hydraulic damper for a vehicle. More particularly, the present invention relates to a hydraulic damper including a hydraulic compression stop assembly.

BACKGROUND OF THE INVENTION

It is known in the art for hydraulic dampers to include a hydraulic compression stop assembly for generating an additional damping force over a predefined section of the piston rod travel during a compression stroke.

An example of such a hydraulic damper is disclosed in international patent application publication no. WO2016146660 which discloses a hydraulic stop member comprising a cup-shaped body, which is adapted to be mounted in a compression chamber. The cup-shaped body is open at its top end facing towards the piston of the shock-absorber, and comprises a side wall and a bottom wall which define, along with the plunger, a working chamber. The side wall and the bottom wall are made as separate pieces and are connected to each other by force-fitting. The side wall has axial channels formed on its inner surface configured to allow the damping fluid to flow axially out of the working chamber. Furthermore, the cup-shaped body has an annular passage, which is in fluid communication with the portion of the compression chamber underneath the bottom wall of the hydraulic stop member.

Another example of such a hydraulic damper is disclosed in international patent application publication no. WO2016126776 which discloses a shock absorber having a hydraulic compression stop including a piston and a sleeve. The sleeve has an open end for receiving the piston and a flow groove that extends longitudinally along an inner surface of the sleeve.

Although hydraulic compression stop assemblies of this kind provide versatile tuning opportunities for shaping damping force characteristics at the very high velocities that may occur during the compression stroke (e.g., while a vehicle hits an obstacle), forces can increase rapidly leading even to damage of the internal components of the damper. Accordingly, there is a need for improvements to hydraulic damper assemblies.

SUMMARY OF THE INVENTION

It is an object of the present invention to provide a hydraulic damper with a hydraulic compression stop assembly which is efficient and simple to manufacture and assemble, and which provides a limit to the maximum damping force that can be generated by the hydraulic compression stop assembly.

Another object of the present invention is to provide a damper with a hydraulic compression stop assembly that does not require substantial modifications of the remaining components of the damper and might be employed as an add-on device in existing damper designs.

A hydraulic damper for a vehicle. The hydraulic damper includes a main tube extending about and along an axis and filled with a working fluid. The main tube has a first inner diameter. A first piston assembly is disposed in the main tube and axially divides the main tube into a rebound chamber and a primary compression chamber. The first piston is axially moveable in a compression stroke and a rebound stroke to generate a damping force. A hydraulic compression stop assembly is disposed in the compression chamber. The hydraulic compression stop assembly includes a narrowed section disposed in the compression chamber of the main tube. The narrowed section extends between an open end and a closed end and has a second inner diameter that is smaller than the first inner diameter of the main tube. A second piston assembly is slideably disposed in the narrowed section and is coupled with the first piston assembly for axially moving with the first piston assembly for generating an additional damping force during the compression stroke. The second piston assembly has a piston tube that extends between an opened end and a shut end, with the shut end disposed opposite the closed end of the narrowed section. A displaceable partition is slideably disposed in the piston tube of the second piston assembly for providing an additional damping force during the compression stroke. The displaceable partition defines a first auxiliary compression chamber between the partition and the closed end of the narrowed section. A second auxiliary compression chamber is defined between the partition and the shut end of the piston tube.

According to another aspect of the disclosure, the first and second auxiliary compression chambers are fluid tightly separated by the partition.

According to another aspect of the disclosure, the partition defines a pressure surface facing the closed end of the narrowed section for providing sliding movement of the partition during a buildup of pressure in the first auxiliary compression chamber against the pressure surface.

According to another aspect of the disclosure, a spring extends between the shut end of the piston tube of the second piston assembly and the partition to bias the partition toward the closed end of the narrowed section.

According to another aspect of the disclosure, a check valve allows fluid to pass from the first auxiliary chamber into the primary compression chamber.

According to another aspect of the disclosure, the check valve includes least one radial opening defined by the piston tube for being selectively covered by the partition, and the check valve further includes at least one axial groove fluidly connecting the radial opening and the first auxiliary chamber.

According to another aspect of the disclosure, the partition includes a pin extending axially toward the closed end of the narrowed section for acting as a mechanical bumper during axial movement of the partition.

According to another aspect of the disclosure, a sleeve is disposed in the first auxiliary chamber and coupled with the piston tube, and the partition is at least partially received by the sleeve.

According to another aspect of the disclosure, the sleeve is threadedly connected to the piston tube.

According to another aspect of the disclosure, the narrowed section is an insert received by the main tube.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Figure 1:
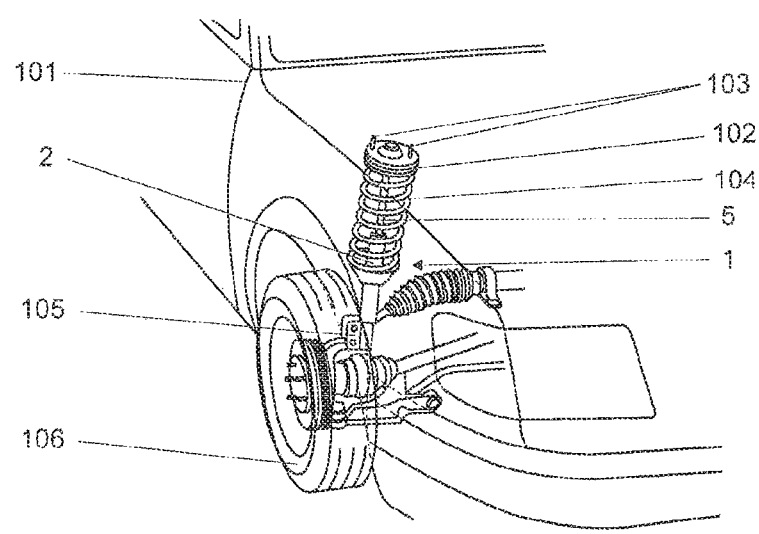
FIG. 1 illustrates a perspective fragment view of a vehicle suspension comprising a damper according to the present invention.

Referring to the Figures, wherein like numerals indicate corresponding parts throughout the several views, FIG. 1 schematically illustrates a fragment of an exemplary vehicle suspension comprising the damper 1 of the present invention attached to a vehicle chassis 101 by means of a top mount 102 and a number of screws 103 disposed on the periphery of an upper surface of the top mount 102. The top mount 102 is connected to a coil spring 104 and a piston rod 5 of the damper 1. The tube 2 of the damper 1 is connected to a steering knuckle 105 supporting a vehicle wheel 106.

Figure 2:
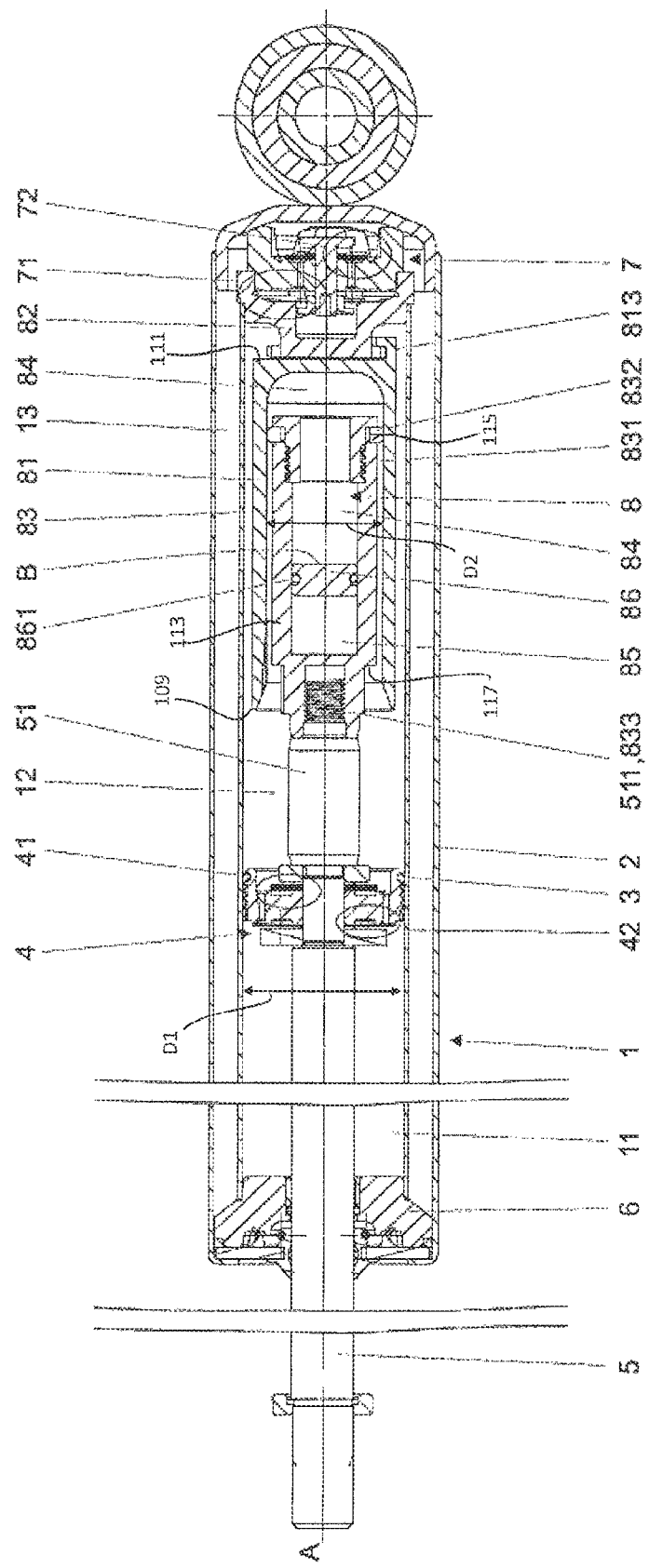
FIG. 2 is a schematic cross-sectional view of an embodiment of a twin-tube damper according to the present invention with a first example embodiment of a hydraulic compression stop assembly.

FIG. 2 presents an embodiment of a twin-tube damper 1 according to the present invention. The damper 1 comprises an external tube 2 and a main tube 3, each extending about and along an axis A and filled with viscous working liquid inside of which a movable piston assembly 4 attached to a piston rod 5 led outside the damper 1 through a sealed piston rod guide 6 is disposed. The main tube 3 has a first inner diameter D1. The damper 1 is also provided with a base valve assembly 7 fixed at the end of the main tube 3 opposite the rod guide 6. The piston assembly 4 makes a sliding fit with the inner surface of the main tube 3 and divides the tube 3 into a rebound chamber 11 (between the piston assembly 4 and the piston rod guide 6) and a primary compression chamber 12 (between the piston assembly 4 and the base valve assembly 7). An additional compensation chamber 13 is located at the other side of the base valve assembly 7. The main piston assembly 4 is axially moveable in a compression stroke toward the piston based valve assembly 7 and a rebound stroke toward the piston rod guide 6.

The piston assembly 4 is provided with compression 42 and rebound 41 valve assemblies to control the flow of working liquid passing between the rebound chamber 11 and the primary compression chamber 12 while the piston assembly 4 is in motion along an axis A. Also the base valve assembly 7 is provided with rebound 71 and compression 72 valve assemblies to control the flow of working liquid passing between the additional compensation chamber 13 and the primary compression chamber 12, respectively, during rebound and compression stroke of the damper 1. As it is well known to those skilled in the art, the valve assemblies 41, 42 and 71, 72 provide design parameters that may be used to shape desired characteristic of the twin-tube damper 1.

The damper 1 is further provided with a hydraulic compression stop assembly 8 located in the primary compression chamber 12 to generate an additional damping force at the end of the compression stroke e.g., in order to avoid an abrupt stop of the piston assembly 4. The compression stop assembly 8 comprises a narrowed section 81 and a second piston assembly 83 apt to be slidably received in this narrowed section 81 to generate an additional damping force at the end of the compression stroke.

Figure 5:
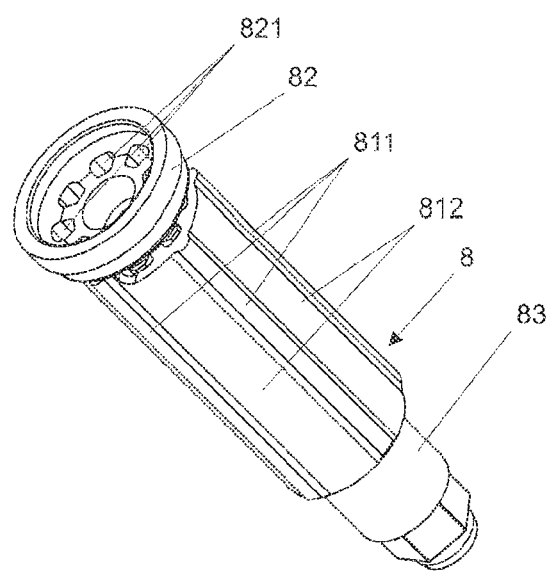
FIG. 5 is an axonometric view of the hydraulic compression stop assembly shown in FIG. 1 and FIG. 2.

The narrowed section 81 has in the presented embodiments form of an insert made of integrally moulded polyamide 6.6 forming a single piece and disposed inside the damper 1 main tube 3 with a loose fit. The narrowed section 81 extends between an open end 109 and a closed end 111 and has a second inner diameter D2 that is smaller than the first inner diameter D1. At its closed end 111 the insert 81 is provided with a circumferential locking yoke 813 extending annularly about a half of the perimeter of the insert 81 and embracing a fixing member 82 press-fitted on the base valve assembly 7. The fixing member 82 is made of sintered steel and stabilises the axial position of the insert 81. The fixing member 82 is also provided with a number of equiangularly spaced axial channels 821 (cf. FIG. 5) enabling for a fluid communication between the primary compression chamber 12 and the additional compensation chamber 13 through the base valve assembly 7 during the compression and the rebound stroke of the damper 1. Furthermore, as shown in FIG. 5, the insert 81 is provided with five equiangularly spaced ribs 811 defining a plurality of slots 812 in between, which are delimited at the outside by the internal surface of the main tube 3. The slots 812 also enable for a flow of the working liquid between the primary compression chamber 12 and the additional compensation chamber 13 through the base valve assembly 7 during the compression and the rebound stroke of the damper 1.

The second piston assembly 83 includes a piston tube 113 extending between an opened end 115 and a shut end 117, with the shut end 117 disposed opposite the closed end 111 of the narrowed section 81. A threaded opening 833 is defined at the shut end 117 which enables threaded of the assembly on an external thread of a threaded projection 511 of a piston rod extender 51 fixed to the piston rod 5 so that the second piston assembly 83 is displaceable along with the main piston assembly 4. The external diameter of the second piston assembly 83 is smaller than the first inner diameter D1 of the main tube 3 enabling for a free flow of working liquid while the second piston assembly 83 moves within the tube 3 and outside the region of the insert 81.

The compression stop assembly 8 further includes a partition 86 axially slideably disposed in the piston tube 113 to define an internal first auxiliary compression chamber 84 between the partition 86 and the closed end 11 of the narrowed section 81, and a second auxiliary compression chamber 85 between the partition 86 and the shut end 117 of the piston tube 113.

The reference numerals corresponding to the same functional elements remain the same throughout the description with suffixes (a, b) added, where appropriate to distinguish particular embodiments of the piston assembly 8a and 8b.

In the embodiments 8 and 8a of the compression stop assembly, the partition 86 comprises an annular seal 861 and fluid tightly separates the first auxiliary compression chamber 84 from the second auxiliary compression chamber 85. Since the first auxiliary compression chamber 84 is in an inactive state of the compression stop assembly 8 fluidly connected with the primary compression chamber 12, it is filed with viscous working liquid. However in the embodiments 8 and 8a, the second auxiliary compression chamber 85 is filed with air or other gaseous medium under a predefined pressure, that should usually be higher than atmospheric pressure.

The second piston assembly 83 further comprises a threaded fixing sleeve 831 and a sealing ring 832 providing a sealing while the second piston assembly 83 moves within the inner insert 81. The sleeve 831 is provided with an external annular torque application surface enabling for screwing the sleeve 831 inside the second piston assembly 83 by means of a flat wrench. The fixing sleeve 831 holds a sealing ring 832 and provides a retaining surface for the partition 86 which in an inactive state of the stop assembly 8 is pushed towards the fixing sleeve 831 by the pressure of the gas inside the second auxiliary compression chamber 85.

When the second piston assembly 83 is disposed within the insert 81 and advances further during the compression stroke of the damper 1, the pressure of the working liquid inside the first auxiliary compression chamber 84, that acts on a predefined pressure surface B of the partition 86, increases and after equalizing gas pressure inside the second auxiliary compression chamber 85 it will push the partition 86 inside the second auxiliary compression chamber 85 enabling for working liquid accumulation inside the second piston assembly 83 and therefore for a smooth increase of the stop 8 reaction force. Obviously, as the diameter of the second piston assembly 83 is smaller than the internal diameter of the insert 81, also the available volume beneath the partition 86 that is available for working liquid is smaller than the corresponding volume of the insert 81. As shown in FIG. 2 in an extreme position of the compression stop 8, the first auxiliary compression chamber 84 filed with working liquid is located not only within the insert 81 but also extends inside the second piston assembly 83 forming an oil volume accumulator therein.

Figure 4:
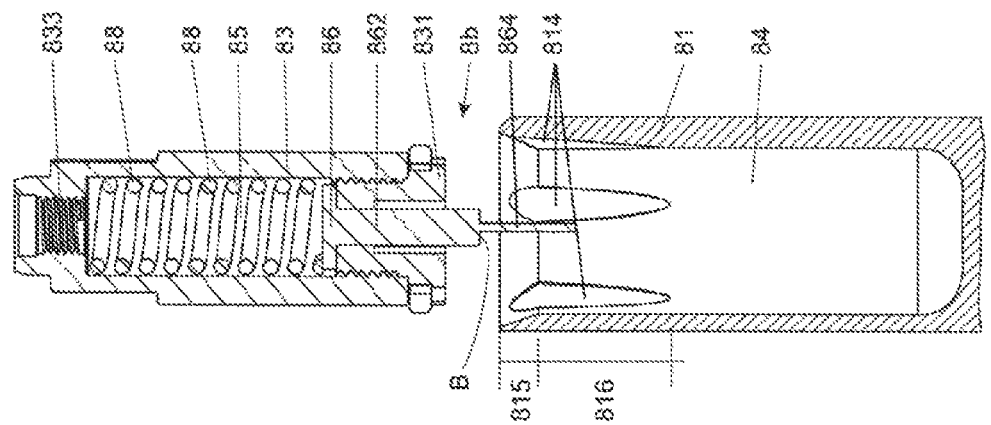
FIG. 4 is a schematic cross-sectional view of a third embodiment of a hydraulic compression stop assembly.
Figure 3B:
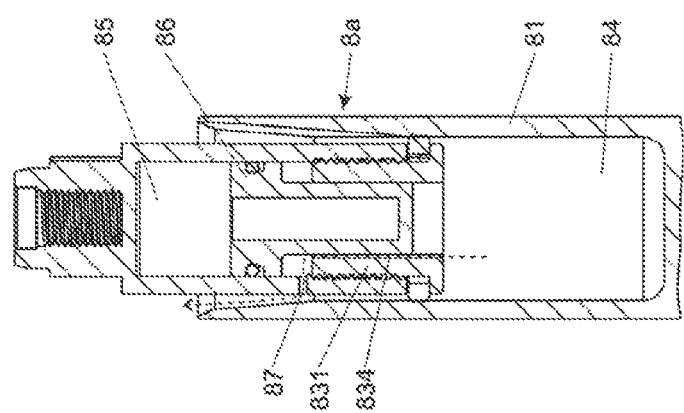
FIG. 3b is a schematic cross-sectional view of the second example embodiment of a compression stop assembly in a compressed position.
Figure 3A:
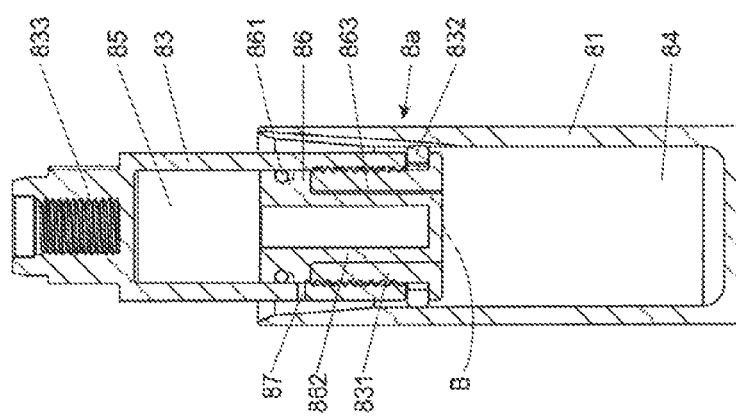
FIG. 3a is a schematic cross-sectional view of a second example embodiment of a compression stop assembly in a rebounded position.

FIGS. 3a-3b and 4 illustrate other exemplary embodiments of the compression stop assemblies according to the present invention.

In an embodiment of the compression stop assembly 8a shown in FIGS. 3a-3b the partition 86 is additionally provided with a cylindrical projection 862 disposed slidably within the fixing sleeve 831. Therefore the partition 86 is disposed slidably both within the second piston assembly 83, as well as within the sleeve 831.

Furthermore the second piston assembly 83 comprises a number of check valves 87 in a form of radial openings opened at the outside of the second piston assembly 83 and at the inside normally covered by the partition 86. Furthermore in this embodiment the cylindrical projection 862 of the partition is provided with a number of equiangularly spaced axial grooves 863 and also the fixing sleeve 831 is provided with a number of equiangularly spaced axial grooves 834. When the partition 86 is pushed inside the second auxiliary compression chamber 85, the openings 87 and the grooves 863 and 834 enable for a restricted flow of working liquid from the first auxiliary compression chamber 84 of the hydraulic compression stop assembly 8 and the main primary compression chamber 12 of the damper 1, while the partition 86 uncovers the openings 87, as shown by a dashed arrow in FIG. 3b.

An embodiment of the compression stop assembly 8b shown in FIG. 4 comprises a coil spring 88 preloaded with a predefined pressure in the second auxiliary compression chamber 85 between the shut end 117 of the second piston assembly 83 and the partition 86 to bias the partition 86 toward the closed end 111 of the narrowed section 81. The partition 86 is also provided with a cylindrical projection 862 disposed slidably within the fixing sleeve 831 but in this embodiment only this cylindrical projection 862 provides axial guidance for the partition 86 within the sleeve 831. The sleeve 831 has an internal torque application surface for a hex key.

As shown, the insert 81 is provided at its entry with five equiangularly spaced grooves 814 extending longitudinally towards a closed end of the first auxiliary compression chamber 84 that allow the working liquid to flow out of and into the chamber 84 around the second piston assembly 83 respectively during compression and rebound stroke. As the cross-sectional surface of the grooves 814 diminishes along their length, the damping force also increases. Furthermore the insert 81 is shaped at its entry to form a conical section 815 followed by a cylindrical section 816. The conical section 815 guides the second piston assembly 83 upon its entry to the first compression chamber 85. Furthermore such a shaping along with the grooves 814 provide smooth built-up of the damping force.

In this embodiment the predefined preload force $F_0$ of the spring 88 establishes a neutral position of the partition 86, while the outer diameter of the cylindrical projection 862 defines the adjustable pressure surface B upon which acts the pressure P in the first auxiliary compression chamber 84 against the preload force $F_0$ of the spring. Therefore as soon as $P \cdot B \geq F_0$ the spring 88 will compress and the partition 86 will be pushed inside the second auxiliary compression chamber 85 with a reaction force linearly proportional to the deflection of the spring 88. This embodiment is remarkably easy and economical to manufacture. A low spring rate, which in this embodiment amounts about 10 N/mm, provides slight and linear force progression.

In this embodiment, the projection 862 of the partition 861 is also provided with an axial pin 864 apt to act as an additional mechanical bumper if the reaction of the spring 88 induced by the pressure surface B of the projection 862 was insufficient.

The above embodiments of the present invention are merely exemplary. The figures are not necessarily to scale, and some features may be exaggerated or minimized. These and other factors however should not be considered as limiting the spirit of the invention, the intended scope of protection of which is indicated in appended claims. Obviously, many modifications and variations of the present invention are possible in light of the above teachings and may be practiced otherwise than as specifically described while within the scope of the appended claims.

What is claimed is:

1. A hydraulic damper for a vehicle, the hydraulic damper comprising:
   a main tube extending about and along an axis and having a first inner diameter and filed with working liquid;
   a first piston assembly disposed in said main tube and axially dividing said main tube into a rebound chamber and a primary compression chamber, and axially moveable in a compression stroke and a rebound stroke to generate a damping force;
   a hydraulic compression stop assembly disposed in said compression chamber, said hydraulic compression stop assembly including:
      a narrowed section disposed in said compression chamber of said main tube and extending between an open end and a closed end and having a second inner diameter being smaller than said first inner diameter of said main tube;

a second piston assembly slideably disposed in said narrowed section and coupled with said first piston assembly for axially moving with said first piston assembly for generating an additional damping force during said compression stroke;

said second piston assembly having a piston tube extending between an opened end and a shut end, with said shut end disposed opposite said closed end of said narrowed section; and a displaceable partition slideably disposed in said piston tube of said second piston assembly for providing an additional damping force during said compression stroke, said displaceable partition defining a first auxiliary compression chamber between said displaceable partition and said closed end of said narrowed section, and a second auxiliary compression chamber between said displaceable partition and said shut end of said piston tube, wherein a spring extends between said shut end of said second piston assembly and said displaceable partition to bias said displaceable partition toward said closed end of said narrowed section, wherein a sleeve is disposed in said first auxiliary compression chamber and coupled with said piston tube, wherein said displaceable partition is provided with a cylindrical projection disposed slidably within the sleeve and extending through the sleeve into the first auxiliary compression chamber to provide axial guidance for said displaceable partition.

2. The hydraulic damper according to claim 1, wherein said first and second auxiliary compression chambers are fluid tightly separated by said displaceable partition.

3. The hydraulic damper according to claim 1, wherein said displaceable partition defines a pressure surface facing said closed end of said narrowed section and providing sliding movement of said displaceable partition during a buildup of pressure in said first auxiliary compression chamber against said pressure surface.

4. The hydraulic damper according to claim 3, wherein an outer diameter of the cylindrical projection defines the pressure surface.

5. The hydraulic damper according to claim 1, wherein said displaceable partition includes a pin extending outwardly from the cylindrical projection and axially toward said closed end of said narrowed section for acting as a mechanical bumper during axial movement of said displaceable partition.

6. The hydraulic damper according to claim 5, wherein the pin is disposed outside of the sleeve when said displaceable partition fluid tightly separates said first auxiliary compression chamber from said second auxiliary compression chamber.

7. The hydraulic damper according to claim 6, wherein the pin extends from the cylindrical projection of said displaceable partition toward said closed end of said narrowed section.

8. The hydraulic damper according to claim 1, wherein said sleeve is threadedly connected to said piston tube.

9. The hydraulic damper according to claim 1, wherein said narrowed section is an insert received by said main tube.

10. The hydraulic damper according to claim 9, wherein said insert is provided at its entry with five equiangularly spaced grooves extending longitudinally towards a closed end of said first auxiliary compression chamber that allow the working liquid to flow out of and into the first auxiliary compression chamber around the second piston assembly respectively during compression and rebound stroke.

11. The hydraulic damper according to claim 10, wherein the insert is shaped at its entry to form a conical section followed by a cylindrical section and the conical section guides the second piston assembly upon its entry to the first compression chamber.

12. The hydraulic damper according to claim 10, wherein the cross-sectional surface of the five equiangularly spaced grooves diminishes along their length.

13. The hydraulic damper according to claim 1, wherein said displaceable partition includes a circular portion in contact with an upper end of the sleeve, wherein the cylindrical projection of said displaceable partition extends from the circular portion toward said closed end of said narrowed section, wherein the circular portion and the cylindrical projection of said displaceable partition are in cooperation with the sleeve to fluid tightly separate said first auxiliary compression chamber from said second auxiliary compression chamber.

14. The hydraulic damper according to claim 1, wherein the cylindrical projection of said displaceable partition extends beyond the sleeve when said displaceable partition fluid tightly separates said first auxiliary compression chamber from said second auxiliary compression chamber.

\* \* \* \* \*